(12) United States Patent
Bavishi et al.

(10) Patent No.: US 11,023,166 B2
(45) Date of Patent: Jun. 1, 2021

(54) QUALITY OF SERVICE CONTROL FOR READ OPERATIONS IN MEMORY SYSTEMS

(71) Applicant: Micron Technology, Inc., Boise, ID (US)

(72) Inventors: Dhawal Bavishi, San Jose, CA (US); Trevor Conrad Meyerowitz, Morgan Hill, CA (US)

(73) Assignee: Micron Technology, Inc., Boise, ID (US)

( * ) Notice: Subject to any disclaimer, the term of this patent is extended or adjusted under 35 U.S.C. 154(b) by 160 days.

(21) Appl. No.: 16/058,130

(22) Filed: Aug. 8, 2018

(65) Prior Publication Data

US 2020/0050395 A1    Feb. 13, 2020

(51) Int. Cl.
  *G06F 3/06*      (2006.01)
  *G06F 13/18*     (2006.01)
  *G06F 13/16*     (2006.01)

(52) U.S. Cl.
  CPC .......... *G06F 3/0659* (2013.01); *G06F 3/0611* (2013.01); *G06F 3/0653* (2013.01); *G06F 3/0656* (2013.01); *G06F 3/0679* (2013.01); *G06F 13/1626* (2013.01); *G06F 13/1673* (2013.01); *G06F 13/18* (2013.01)

(58) Field of Classification Search
  CPC .... G06F 3/0659; G06F 3/061; G06F 13/1642; G06F 3/0611; G06F 13/1626; G06F 9/4881; G06F 3/0653; G06F 13/1673; G06F 3/0656; G06F 9/3855; G06F 13/18; G06F 13/30
  See application file for complete search history.

(56) References Cited

U.S. PATENT DOCUMENTS

| | | |
|---|---|---|
| 2009/0006719 A1 | 1/2009 | Traister |
| 2012/0215741 A1 | 8/2012 | Poole et al. |
| 2015/0095605 A1 | 4/2015 | Roberts et al. |
| 2016/0191857 A1 | 6/2016 | Freedman et al. |
| 2017/0351582 A1 | 12/2017 | Ebsen et al. |
| 2018/0173460 A1* | 6/2018 | Bandic .................. G06F 3/0604 |
| 2019/0196996 A1* | 6/2019 | Balakrishnan .......... G06F 13/30 |

OTHER PUBLICATIONS

International Search Report and Written Opinion, PCT/US2019/043301, dated Nov. 11, 2019.

* cited by examiner

*Primary Examiner* — Reginald G Bragdon
*Assistant Examiner* — Thanh D Vo
(74) *Attorney, Agent, or Firm* — Greenberg Traurig (57) ABSTRACT

A memory system having memory components, and a processing device, operatively coupled with the memory components, to: receive read requests from a host system to retrieve data from the memory components; store the read requests in a buffer; track ages of the read requests and priorities specified by the host system for the read requests; and schedule execution of a first read request from the buffer based on an age of the first read request and a threshold time period.

14 Claims, 6 Drawing Sheets

QUALITY OF SERVICE CONTROL FOR READ OPERATIONS IN MEMORY SYSTEMS

FIELD OF THE TECHNOLOGY

At least some embodiments disclosed herein relate to memory systems in general, and more particularly, quality of service control for memory read operations in memory systems.

BACKGROUND

A memory sub-system can be a storage system, such as a solid-state drive (SSD) or, a memory module, such as a non-volatile dual in-line memory module (NVDIMM), and can include one or more memory components that store data. The memory components can be, for example, non-volatile memory components and volatile memory components. In general, a host system can utilize a memory sub-system to store data at the memory components and to retrieve data from the memory components.

A standardized communication protocol allows the host system to communicate with the memory sub-system to store data and retrieve data.

For example, JEDEC (Joint Electron Device Engineering Council) Solid State Technology Association has proposed a "DDR5 NVDIMM-P Bus Protocol" for communications between a host system and an NVDIMM-P memory module. This protocol is described in detail by the JEDEC Committee Letter Ballot, Committee: JC-45.6, Committee Item Number 2261.13D, Subject: "Proposed DDR5 NVDIMM-P Bus Protocol", which is hereby incorporated by reference herein in its entirety.

BRIEF DESCRIPTION OF THE DRAWINGS

The present disclosure will be understood more fully from the detailed description given below and from the accompanying drawings of various embodiments of the disclosure.

DETAILED DESCRIPTION

At least some aspects of the present disclosure are directed to scheduling read requests buffered in a memory sub-system and reducing the execution delay of low priority read requests. A memory sub-system is also hereinafter referred to as a "memory device". An example of a memory sub-system is a memory module that is connected to a central processing unit (CPU) via a memory bus, such as a dual in-line memory module (DIMM), a small outline DIMM (SO-DIMM), a non-volatile dual in-line memory module (NVDIMM), etc. Another example of a memory sub-system is a storage system, such as a solid-state drive (SSD). In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

In some computer systems, such as a host system and a memory sub-system that are connected using an NVDIMM-P bus, read commands to retrieve data from the memory sub-system can be buffered in the memory sub-system for execution in a time period that is not predetermined. The memory sub-system is not required to execute the read commands in the order in which the commands are received in the memory sub-system. Further, read commands can have a priority data field that indicates the priority of read commands relative to each other. However, executing read commands according to the priority specified in the read commands can cause excessive delay in the execution of low priority read commands in some instances. For example, when a low priority read command is received and queued in the memory sub-system before a large number of high priority read commands, the low priority read command would be executed after the completion of the high priority read commands. The completion of the large number of high priority read commands before the execution of the low priority read command can lead to excessive delay in the execution of the low priority read command.

At least some aspects of the present disclosure address the above and other deficiencies by the memory sub-system tracking an amount of time that a read command has been pending in the memory sub-system and adjusting the priority of the read command for execution based on the amount of time. For example, when the read command has been pending for longer than a threshold amount of time, the read command can be scheduled for execution before other read commands that have a higher priority specified in their priority data field. The memory sub-system can include quality of service logic that enforces a threshold amount of time for which a read command can be pending before the execution priority of the read command is elevated. For example, the quality of service logic can establish a threshold for a read command; and, if the age of the read command is above the threshold before the read command is serviced, the read command can be moved to the top of a queue for execution, or to a higher-priority queue of read commands. Thus, the memory sub-system balances the priority of the read commands initially requested in their priority data field and service delay in execution of the read commands.

Figure 1:
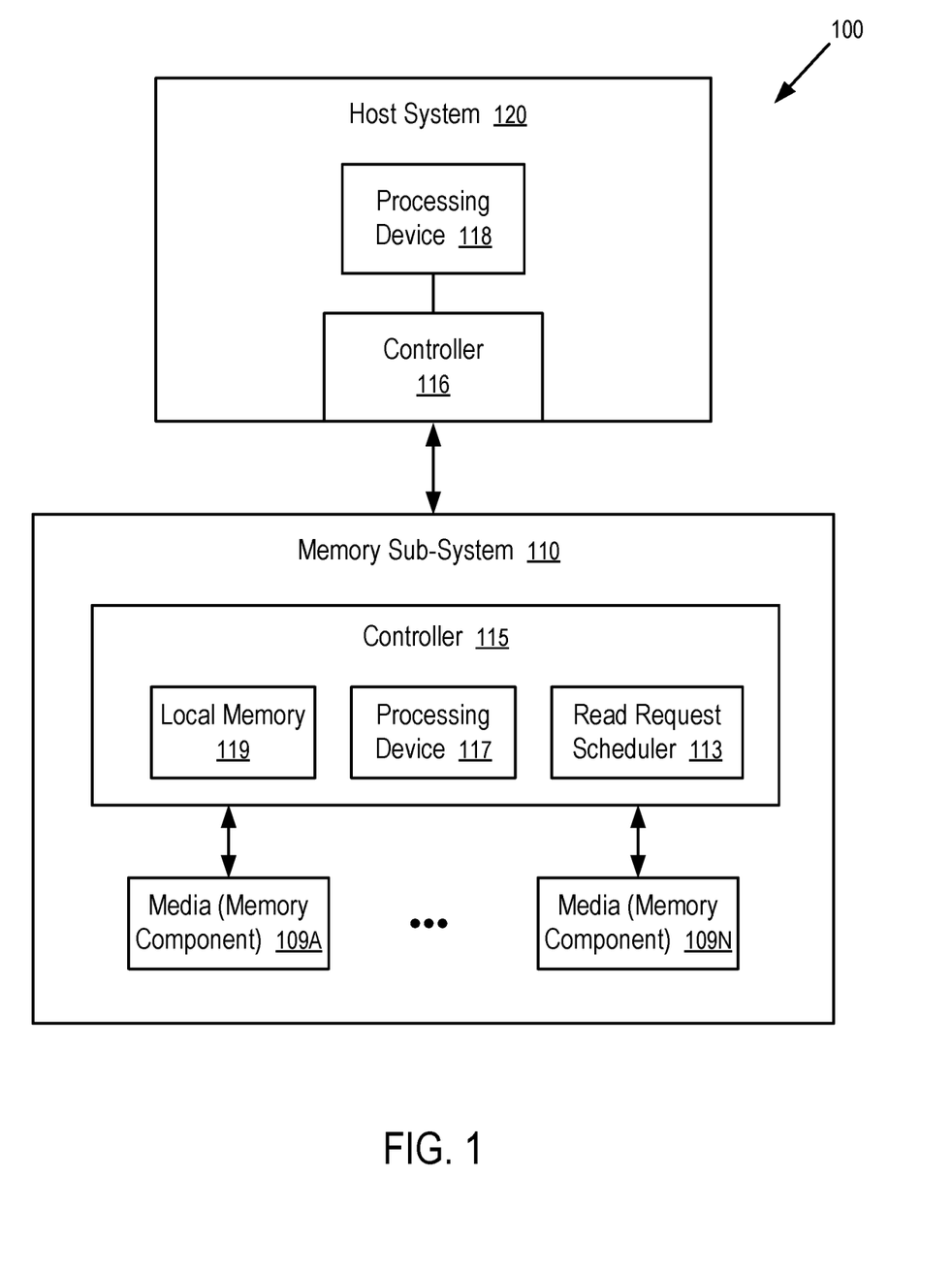
FIG. 1 illustrates an example computing system having a memory sub-system in accordance with some embodiments of the present disclosure.

FIG. 1 illustrates an example computing system 100 having a memory sub-system 110 in accordance with some embodiments of the present disclosure. The memory sub-system 110 can include media, such as memory components 109A to 109N. The memory components 109A to 109N can be volatile memory components, non-volatile memory components, or a combination of such. In some embodiments, the memory sub-system 110 is a memory module. Examples of a memory module includes a DIMM, NVDIMM, and NVDIMM-P. In some embodiments, the memory sub-system is a storage system. An example of a storage system is an SSD. In some embodiments, the memory sub-system 110 is a hybrid memory/storage sub-system. In general, the computing environment can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATE) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 120 and the memory sub-system 110. The host system 120 can further utilize an NVM Express (NVMe) interface to access the memory components 109A to 109N when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The host system 120 includes a processing device 118 and a controller 116. The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110.

In general, the controller 116 can send commands or requests to the memory sub-system 110 for desired access to memory components 109A to 109N. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory components 109A to 109N and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory components 109A to 109N can include any combination of the different types of non-volatile memory components and/or volatile memory components. An example of non-volatile memory components includes a negative-and (NAND) type flash memory. Each of the memory components 109A to 109N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 109A to 109N can be based on any other type of memory such as a volatile memory. In some embodiments, the memory components 109A to 109N can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 109A to 109N can be grouped as memory pages or data blocks that can refer to a unit of the memory component used to store data.

The controller 115 of the memory sub-system 110 can communicate with the memory components 109A to 109N to perform operations such as reading data, writing data, or erasing data at the memory components 109A to 109N and other such operations (e.g., in response to commands scheduled on a command bus by controller 116). The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processing device 117 (processor) configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code.

While the example memory sub-system 110 in FIG. 1 has been illustrated as including the controller 115, in another embodiment of the present disclosure, a memory sub-system 110 may not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 109A to 109N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 109A to 109N. The controller 115 can further include host interface circuitry to communicate with the host system 120 via the physical host interface. The host interface circuitry can convert the commands received from the host system into command instructions to access the memory components 109A to 109N as well as convert responses associated with the memory components 109A to 109N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 109A to 109N.

The memory sub-system 110 includes a read request scheduler 113 that can schedule and re-schedule the execution order of read requests received from the host system 120 and buffered in the memory sub-system 110. In some embodiments, the controller 115 in the memory sub-system 110 includes at least a portion of the read request scheduler 113. For example, the controller 115 can include logic circuitry implementing the read request scheduler 113. For example, the processing device 117 (processor) of the controller 115 can be configured to execute instructions stored in local memory for performing the operations of the read request scheduler 113 described herein. In some embodiments, the read request scheduler 113 is part of an operating system of the host system 120, a device driver, or an application.

The read request scheduler 113 of the memory sub-system 110 can track an amount of time that a read request has been pending in the memory sub-system 113 and determine the priority of the read request for execution based at least in part on the amount of time. For example, when the read request has been pending for longer than a threshold amount of time, the read request can be scheduled for execution earlier than a time that would be scheduled based on requested priorities of read requests pending in the memory sub-system 110. The read request scheduler 113 can include quality of service logic that has a threshold time period for the pendency of the read request. The read request scheduler 113 adjusts the scheduling of the read request for execution such that the pendency of the read request in the memory sub-system 110 is limited by or according to the threshold time period, which provides a level of quality of service for the read request in terms of latency or pendency. Further details with regards to the operations of the information request manager 113 are described below.

Figure 2:
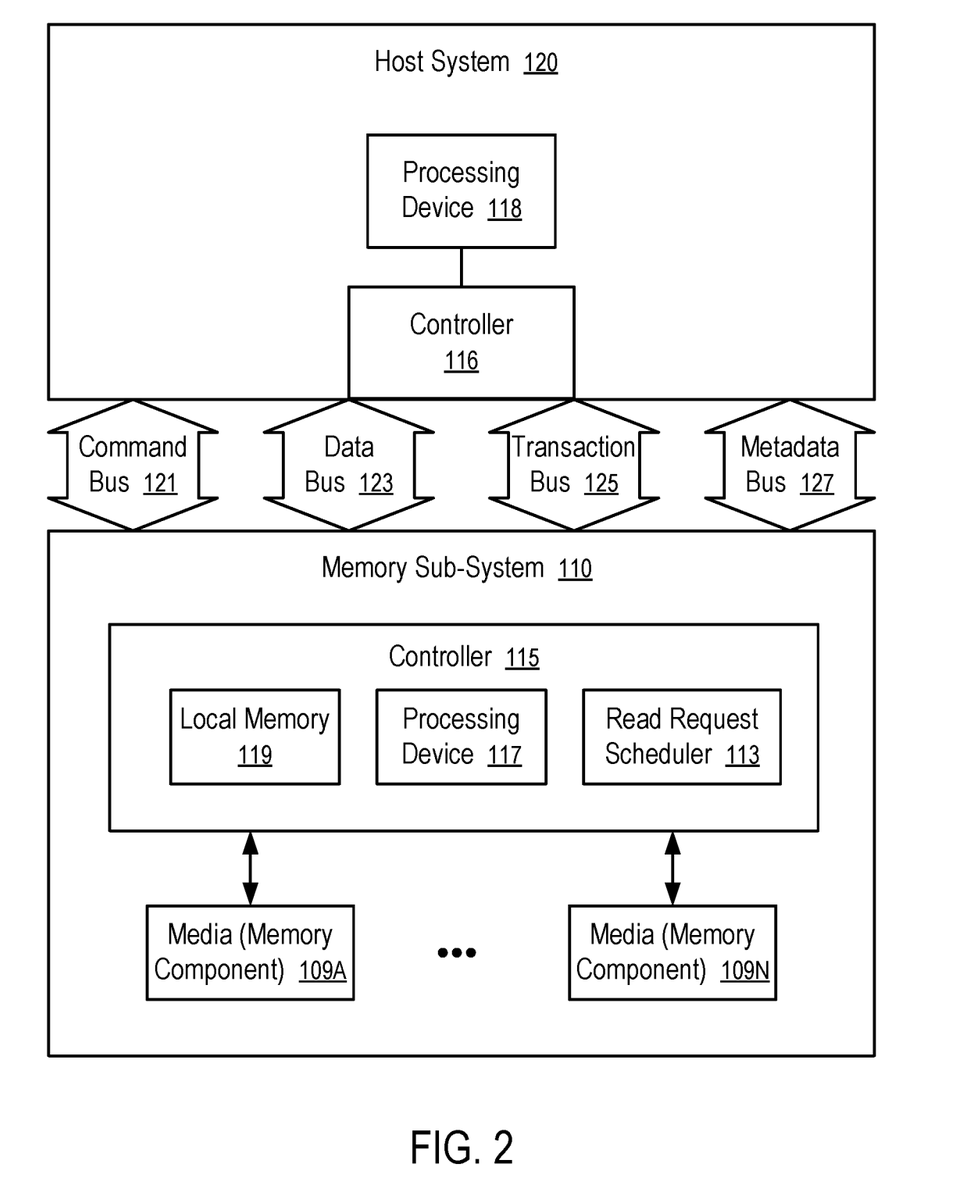
FIG. 2 illustrates an example computing system that includes an information request manager in accordance with some embodiments of the present disclosure.

FIG. 2 illustrates an example computing system that includes a read request scheduler 113 in accordance with some embodiments of the present disclosure.

Merely for non-limiting purposes of illustration in describing FIG. 2, the controller 116 of the host system 120 is sometimes referred to below as memory controller 116, and the controller 115 of the memory sub-system 110 is sometimes referred to below as media controller 115.

In FIG. 2, the communication channel between the host system 120 and the memory sub-system 110 includes the command bus 121, a data bus 123, a transaction bus 125, and a metadata bus 127. A communication protocol for the communication channel allows asynchronous access to the memory sub-system 110 for data storage and retrieval by the host system 120. For example, the memory sub-system 110 can be an NVDIMM; and the host system 120 can access the memory controller 116 in accordance with a JEDEC NVDIMM-P Bus Protocol using the command bus 121, the data bus 123, the transaction bus 125, and the metadata bus 127.

For example, the memory controller 116 can issue a write command to store data in the memory sub-system 110. After a fixed and predetermined time window from the transmission of the write command on the command bus 121, the memory controller 116 starts transmitting the data on the data bus 123. The memory sub-system 110 is not required to complete the operations of the write command within a predetermined time period. Examples of such a write command include XWRITE and PWRITE identified in the JEDEC NVDIMM-P Bus Protocol.

For example, the memory controller 116 can issue a read command to request information from the memory sub-system 110. The memory sub-system 110 is not required to generate a response within a predetermined time window from the read command. Examples of such a read command include XREAD and SREAD identified in the JEDEC NVDIMM-P Bus Protocol. An XREAD can be given a predetermined read ID to indicate that it is an information request (status_read) that will return system state, but won't access the media directly.

In response to the read command, the memory sub-system 110 prepares data that is requested by the read command. For example, the media controller 115 can retrieve data from media (e.g., 109A, . . . , or 109N) and buffer the retrieve data in the local memory 119 or another memory such that the data can be successfully transmitted to the memory controller 116 within a predetermined time window when such a transmission is requested.

When the requested data is ready for transmission, the memory sub-system 110 can provide a response signal in the transaction bus 125. When the memory controller 116 is informed of the readiness of the memory sub-system 110 to transmit certain data, the memory controller 116 can provide a send command to request the memory sub-system 110 to start transmitting data on the data bus 123 within a predetermined time window from the send command. When responding to the send command, the memory sub-system 115 can also send transaction status information, such as read ID identifying the corresponding read command, write credit information as further discussed below, metadata corresponding to the transaction, and/or error correction code (ECC). An example of such a send command is SEND identified in the JEDEC NVDIMM-P Bus Protocol.

The memory sub-system 110 can buffer read commands and write commands received from the command bus 121 in the local memory 119 or another memory. The media controller 115 can execute the buffered commands in an order different from the order in which the commands are received.

The memory sub-system 110 has a certain amount of capacity for buffering pending read commands and write commands and their associated data. The memory controller 116 and the media controller 115 can communicate with each other to prevent buffer overflow in the memory sub-system 110.

For example, a write credit can be used to represent a unit of buffer capacity that is available for buffering a write command and its associated data of a predetermined size. In some instances, a write command can have data larger than the predetermined size; and such a write command requires multiple write credits for buffering the command and its data in the memory sub-system 110.

The memory controller 116 can maintain a count of write credits it can use to transmit write commands on the command bus 121 to the memory sub-system 110. When a write command is sent over the command bus 121, the memory controller 116 deducts the write credits used by the write command. To avoid buffer overflow, the memory controller 116 should not transmit a write command when the memory controller 11 does not have sufficient write credits for transmitting the write command to the memory sub-system 110.

The media controller 115 can maintain a count of write credits it can return to the memory controller 116 for completed write commands. After a write command buffered in the memory sub-system 110 is completed, the buffer space used by the write command can be freed to accept further write commands from the memory controller 116. The write credits used by the write command that has been completed can be added to the count of write credits that can be returned to the memory controller 116.

The memory sub-system 110 can use the metadata bus 127 to specify the number of write credits it is returning to the memory controller 116. For example, after sending a response signal on the transaction bus 125 to enable the memory controller 116 to issue a send command, the media controller 115 can transmit the number of returned write credits using the metadata bus 127. The memory sub-system 110 can transmit such a response signal in response to a read command, such as XREAD and SREAD identified in the JEDEC NVDIMM-P Bus Protocol. An example of the response signal is RSPx_n identified in the JEDEC NVDIMM-P Bus Protocol.

When the memory controller 116 uses a read command to request retrieval of data from an address, the memory controller 116 can place an address command immediately following the read command to specify the address. Similarly, when the memory controller 116 uses a write command to store data at an address, the memory controller 116 can place an address command immediately following the write command to specify the address. An example of such an address command is XADR identified in the JEDEC NVDIMM-P Bus Protocol.

The memory sub-system 110 can include a read buffer to store pending read commands/requests received from the host system 120. The read buffer can be implemented in the local memory 119 or another memory of the memory sub-system 110. A read command can include a data field that indicates the requested priority of the read command. The priority data field can have one bit indicating whether or not the read command has a high priority as requested by the host system 120. Alternatively, the priority data field of a read command can select, for the read command, a priority level from more than two predefined priority levels.

The read request scheduler 113 can track the age of a read command stored in the read buffer. For example, the age of the read command can be identified from the time of arrival of the read command in the memory sub-system 110. The read request scheduler 113 schedules the execution of the read command based on its age and/or the requested priority of the read command.

For example, the read request scheduler 113 can implement a quality of service policy for read commands. Based on the quality of service policy, the read request scheduler 113 determines a threshold time period for a read command. When the age of the read command approaches or reaches the threshold time period, the read request scheduler 113 elevates the execution priority of the read command and performs an operation to reduce further delay in executing the read command. For example, the read request scheduler 113 can maintain a queue of read commands for execution. Selected read commands buffered in the memory sub-system 110 are placed in the queue. The commands in the queue are executed in the order of commands in the queue. When the age of the read command approaches or reaches the threshold time period, the read request scheduler 113 adds the read command to the queue. For example, for expedited processing of the read command, the read request scheduler 113 can insert the read command to the front of the queue. Alternatively, the request scheduler 113 can add the read command to the end of the queue.

After the media controller 115 executes a read command and retrieves data requested by the read command from the memory components 109A to 109N, the media controller 115 can transmit a response signal to the host system 120 using the transaction bus 125. The response signal can cause the memory controller 116 of the host system 120 to issue a send command on the command bus 121. Within a predetermined time window from the send command, the media controller 115 can transmit the data retrieved according to the read command to the host system 120 using the data bus 123. After the memory sub-system 110 transmits the data to the host system 120, the read command and its associated data can be cleared from the read buffer.

In some instances, the read request scheduler 113 arranges the execution order of buffered read commands to transmit the response signal for the read command such that the time period between receiving the read command the transmission of the response signal is substantially limited by the threshold time period.

In some instances, the threshold time period is predetermined. Alternatively, the threshold time period is selected or calculated for a read command based on certain data fields of the read command, such as the requested priority specified in the priority data field of the read command.

In some instances, when there are multiple read commands that are selected for execution based on their ages, the read commands can be scheduled for execution in accordance with their ages (e.g., without considering other data fields of the read commands, such as the priority data field).

Figure 3:
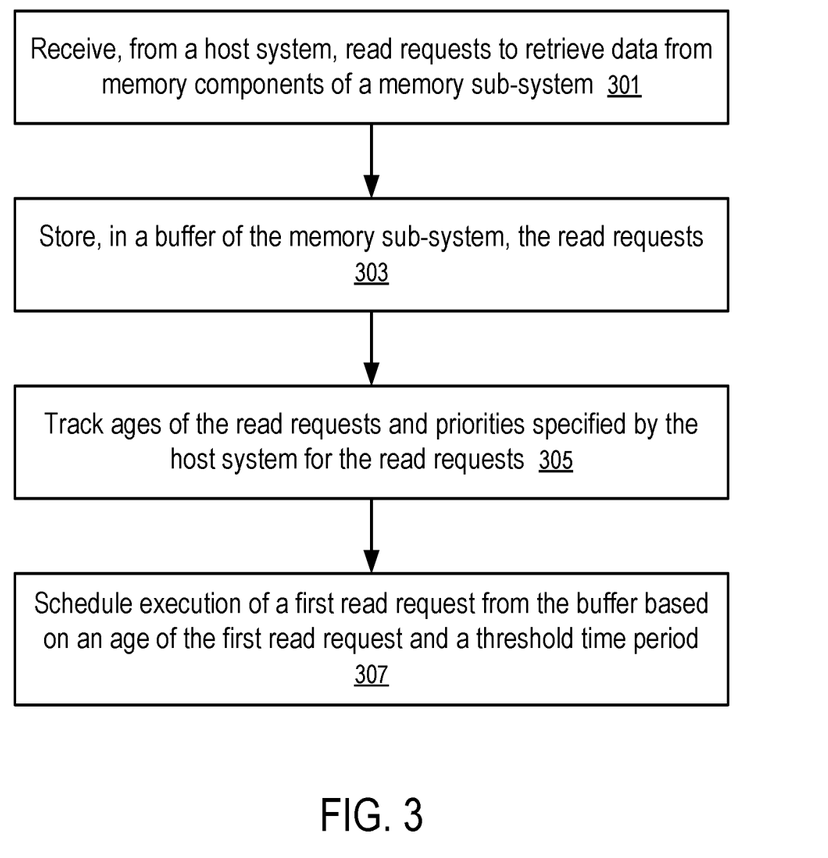
FIG. 3 is a flow diagram of an example method to schedule read commands for executing in a memory sub-system in accordance with some embodiments of the present disclosure.

FIG. 3 is a flow diagram of an example method to schedule read commands for executing in a memory sub-system 111 in accordance with some embodiments of the present disclosure. The method of FIG. 3 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 3 is performed at least in part by the read request scheduler 113 of FIG. 1 or 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 301, the media controller 115 of the memory sub-system 110 receives, from a host system 120, read requests to retrieve data from memory components 109A to 109N of the memory sub-system 110.

At block 303, the media controller 115 stores, in a buffer of the memory sub-system 110, the read requests. For example, the buffer can be implemented in the local memory 119 or another memory. The media controller 115 can execute the read requests by retrieving data requested by the read requests from the memory components 109A to 109N, store the retrieved data in the data buffer, send response signals to the host system 120 for the read requests, and transmit the data to the memory controller 116 of the host system 120 when the memory controller 116 is ready to receive the data. In general, the media controller 115 can execute the read requests in an order determined by the read request scheduler 113.

At block 305, the read request scheduler 113 track ages of the read requests and priorities specified by the host system 120 for the read requests. For example, the host system 120 can specify a priority level of a read request using a priority data field of the read request.

At block 307, the read request scheduler 113 schedules execution of a first read request from the buffer based on an age of the first read request and a threshold time period.

For example, when the age of the first read request is within the threshold time period, the read request scheduler 113 can delay the execution of the first read request. For example, when both the first read request and a second read request are pending and the host system 120 has specified a higher priority for the second read request than for the first read request, the read request scheduler 113 can postpone the execution of the first read request until after the second read request is completed.

When the age of the first read request reaches or exceeds the threshold time period, the read request scheduler 113 does not delay the execution of the first read request. For example, when both the first read request and a second read request are pending and the host system 120 has specified a higher priority for the second read request than for the first read request, the read request scheduler 113 can cause the media controller 115 of the memory sub-system 110 to execute the first read request before the second read request.

For example, the read request scheduler 113 can schedule for execution first read commands that have ages that exceed the threshold time period before the execution of other read commands; and the read request scheduler 113 can schedule the first read commands in an order according to the arrival times, or ages, of the first read commands in the memory sub-system 110.

When the memory sub-system 110 does not have read commands that have ages exceeding the threshold time period, the read request scheduler 113 can schedule for execution second read commands that have highest priority requested by the host system 120 using the priority data field of read commands. The read request scheduler 113 can schedule the second read commands in an order according to the arrival times, or ages, of the second read commands in the memory sub-system 110.

For example, when the memory sub-system 110 has a set of read commands stored in a buffer (e.g., in the local memory 119 or another memory), the read request scheduler 110 can identify the oldest low priority read command and calculate a delay window after which the pendency period of the low priority read command will reach the threshold time period. The read request scheduler 110 then schedules execution of high priority read commands within the delay window of the low priority read command. After the delay window, the read request scheduler 110 can schedule execution of low priority read command and/or other commands that have pendency periods reaching the threshold time period. When there is no read command that has an age exceeding the threshold time period, the read request scheduler 110 can again identify the oldest low priority read command and calculate a delay window for the execution of high priority read commands.

For example, the memory sub-system 110 can queue read requests in a buffer in an order according to the arrival time of the request requests in the memory sub-system 110. The host system 120 can specify a read request either as a high priority request or a low priority request using the priority data field of the read request. The read request scheduler 113 can scan through the buffered read requests to identify the oldest low priority request. The read request scheduler 113 can calculate a delay time window from the different between the threshold time period and the age of the first low priority request. After the delay time window is computed, the read request scheduler 113 can cause the execution of high priority read requests in the buffer based on their order in the buffer. Some of the high priority read requests can be located before the oldest low priority request buffer, and some of the high priority read requests can be located after the oldest low priority request in the buffer. After the expiration of the delay time window, the read request scheduler 113 can cause the execution of read commands that have reached the threshold time period in accordance with their order in the buffer. After all of the read commands that have reached the threshold time period have been executed, the request scheduler 113 can again search for the oldest low priority read request remaining in the buffer to determine the next delay window. Optionally, the memory sub-system 110 can receive further read commands during the execution of some of the read commands that are already stored in the buffer. The further read commands can be added to the buffer in an order according to their arrival times.

The technique discussed above for a two-level priority system can be extended to read commands that have more than two different levels of priorities (e.g., a priority data field that is larger than a single bit). For example, the delay time window can be computed based on the first read request that does not have a top priority level. The execution of commands during the delay time window is based on priority level from high to low and according to arrival time for execution of read commands of the same priority level. After the time window, the read commands are executed according to arrival time, until an oldest, non-top-priority read command is reached that provides another delay time window.

In some embodiments, the read request scheduler 113 maintains a queue of read commands that are selected from the buffer for execution. The commands in the queue are executed in the order of the commands in the queue. The order of the commands in the queue represents the relative execution priority of the commands assigned by the read request scheduler 113 to the commands. When the age, or pendency period, of a read command reaches the threshold time period, the read request scheduler 113 adds the read command to the queue. The read request scheduler 113 can add the read command to the top of the queue in some implementations, or the bottom of the queue in other implementations.

In some embodiments, the read request scheduler 113 maintains a plurality of queues, one for each level of priority levels that can be identified by the host system 120 using the priority data field of read commands. Different threshold time periods can be configured for different queues. When a read command in a lower level queue reaches a threshold time period for the queue, the read command is promoted and moved into a higher level queue, as if the read command were initially specified by the host system to have a priority corresponding to the higher level queue. The read command can be promoted to the top of the higher level queue, to the end of the higher level queue, or another location in the higher level queue. Another read command of the same priority arriving after the promotion can be queued after the promoted read command. The read request scheduler 113 can track the age of the read commands in the queues and apply the threshold time periods of the queues against the ages of the read commands in the queues to promote read commands from a lower priority queue to a higher priority queue. Thus, the latency, or delay time period, of a read command is regulated based on the threshold time periods for the queues; and the execution of a low priority read command cannot be blocked by an influx of high priority read command to have excessive latency.

Figure 4:
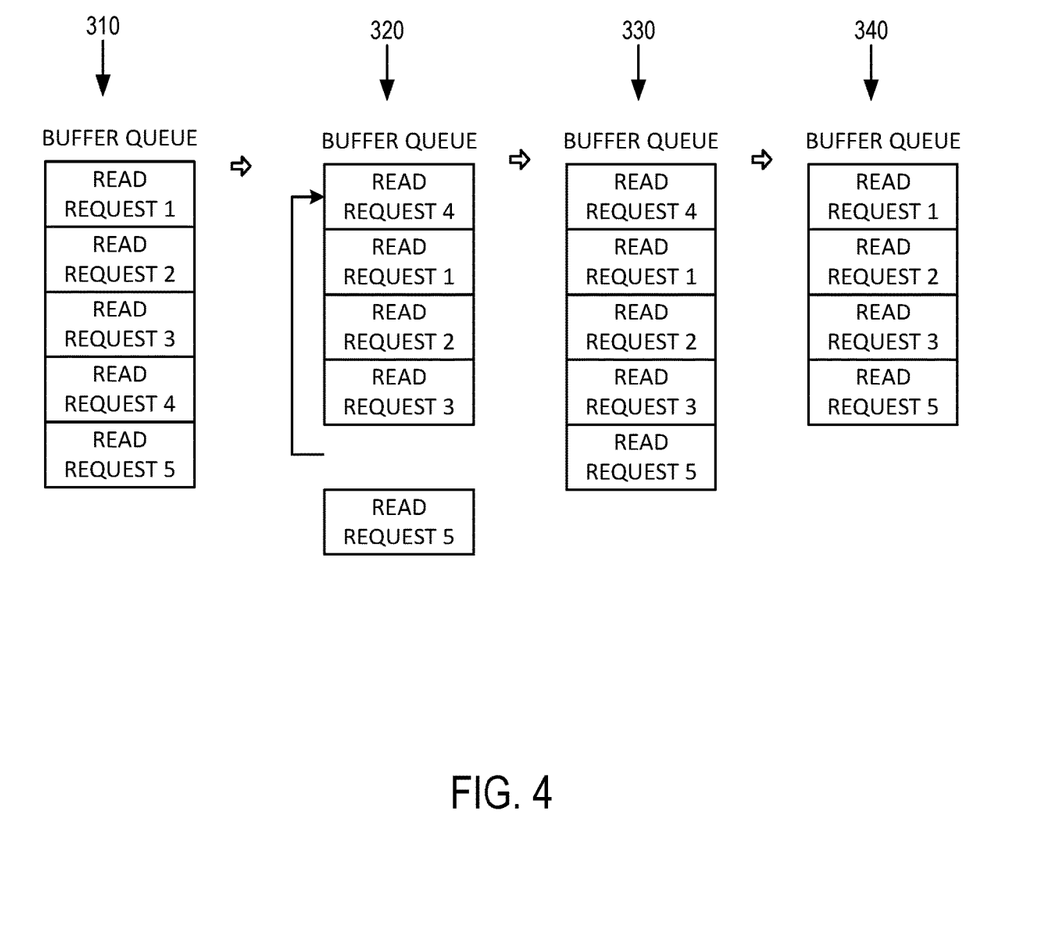
FIG. 4 shows an example of scheduling read commands in a memory sub-system in accordance with some embodiments of the present disclosure.

FIG. 4 shows an example of scheduling read commands in a memory sub-system in accordance with some embodiments of the present disclosure.

Specifically, FIG. 4 illustrates four states 310, 320, 330, 340 of a single queue of five buffered read requests (read request 1, read request 2, read request 3, read request 4, and read request 5).

In the example of FIG. 4, read requests 1, 2, and 3 are relatively higher priority, and read requests 4 and 5 are relatively lower priority. As a result, in a first state 310 of FIG. 4, read requests 1, 2, and 3 have been scheduled for servicing by being placed above read requests 4 and 5 in the queue. However, read requests 1, 2, and 3 can have been received after read requests 4 and 5.

As illustrated in FIG. 4, in some embodiments, scheduling read requests for servicing includes maintaining a single queue in the memory sub-system 110; and an incoming read request is scheduled for servicing by being added to the end of the single queue when received, or at an appropriate place in the queue based on the priority of the read request. Further read requests that are received after the read request are placed after the read request in the queue, or at appropriate locations in the queue based on the priorities of the further read requests, in embodiments. Requests in the queue can be serviced from front to back, and each new request that is received can be placed at the back of the queue, in embodiments.

FIG. 4 illustrates an example of moving a read request to the top of the queue in which the read request was originally placed for scheduling. Specifically, in the example of FIG. 4, the age of read request 4 has exceeded the age threshold associated with read request 4. Accordingly, in the second state 320 illustrated in FIG. 4, read request 4 is moved to the top of the queue and, in the third state 330, read request 4 is at the top of the queue. Accordingly, read request 4 is placed ahead of read requests 1, 2, and 3 in the queue as a result of re-scheduling based on the age of the read request 4, even though read requests 1, 2, and 3 are of higher priority (that is, are associated with higher priority values) than read request 4.

In embodiments in which a single queue of requests is maintained, servicing the read request according to the schedule includes servicing the next request in the queue (e.g., from the front or top of the queue) until the read request is serviced. For example, as illustrated in FIG. 4, in a single-queue embodiment, servicing the read request includes sequentially the top read request from the queue and removing that request from the queue after servicing. For example, in fourth state 340 of FIG. 4, read request 4 has been serviced. Accordingly, by moving read request 4 to the top of the queue, read request 4 is serviced before read requests 1, 2, and 3, even though read requests 1, 2, and 3 are associated with higher priority values than read request 4.

Figure 5:
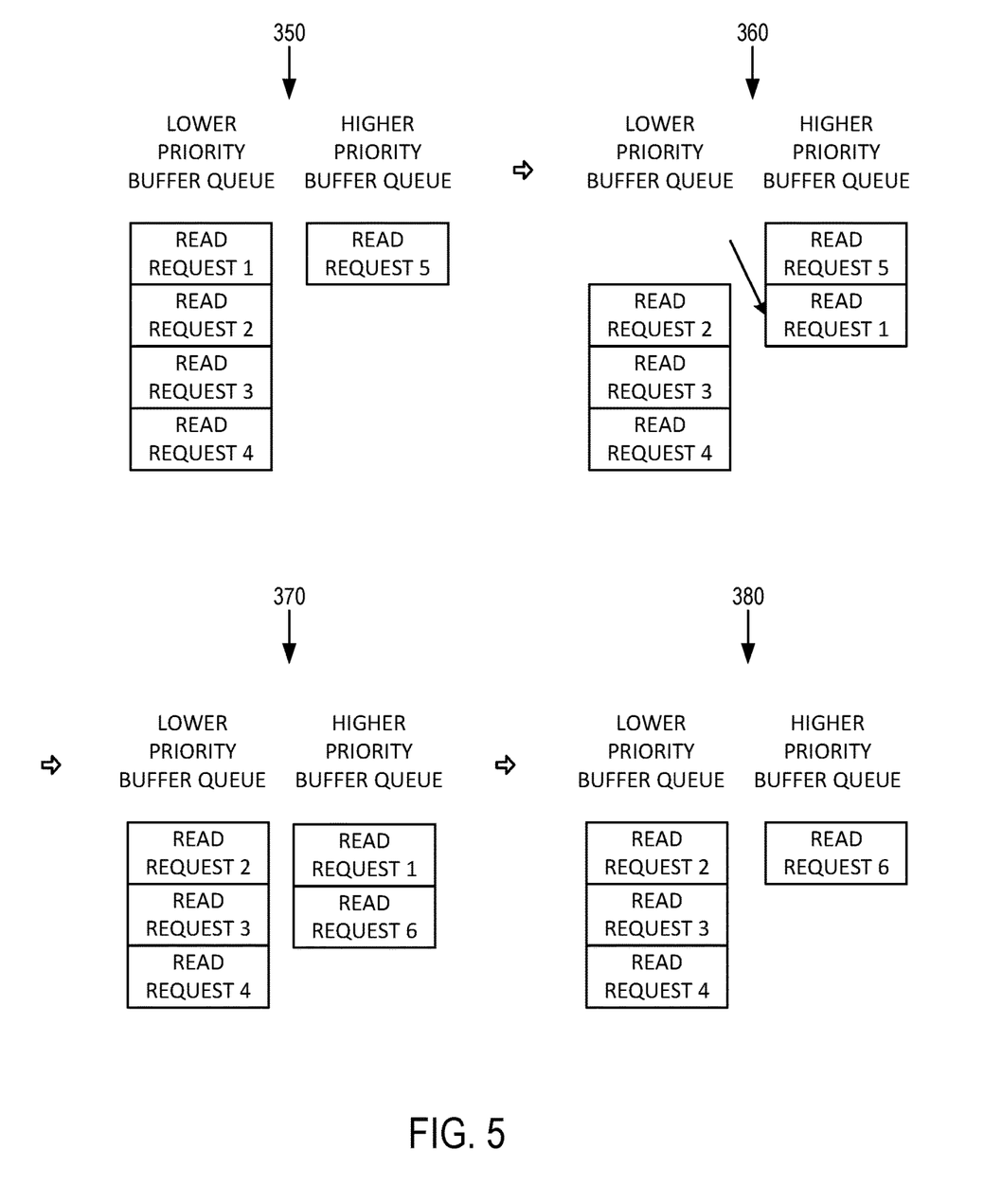
FIG. 5 shows another example of scheduling read commands in a memory sub-system in accordance with some embodiments of the present disclosure.

FIG. 5 shows another example of scheduling read commands in a memory sub-system in accordance with some embodiments of the present disclosure.

Specifically, FIG. 5 illustrates four states 350, 360, 370, 380 of two queues of initially five, then six total read requests (read request 1, read request 2, read request 3, read request 4, read request 5, and read request 6).

In the example of FIG. 5, read requests 1, 2, 3, and 4 are relatively lower priority, and read requests 5 and 6 are relatively higher priority. Thus, in a first state 350 of FIG. 5, read requests 1, 2, 3, and 4 have been scheduled for servicing by being placed in a lower-priority queue, and read request 5 has been scheduled for servicing by being placed in a relatively higher-priority queue.

In general, the memory sub-system 110 can maintain a respective queue for each priority value that can be specified by the host system 120 in the priority data field of read commands, in an embodiment. Accordingly, the read request scheduler 113 can add an incoming read request to the back of the queue associated with the priority value of the read request.

FIG. 5 illustrates an example of adding the read request to a higher-priority queue. In the example of FIG. 5, the age of read request 1 has exceeded the age threshold associated with read request 1. Accordingly, in the second state 360 of FIG. 5, read request 1 is moved to the higher-priority queue.

In the example illustrated in FIG. 5, read request 1 is moved to the end of the higher-priority queue. In other embodiments, moving a request to a higher-priority queue includes moving the read request to the top of the higher-priority queue, or to another position in the higher-priority queue.

In the example illustrated in FIG. 5, two queues are illustrated, associated with two respective priority levels. In embodiments, more than two priority values are possible. Where more than two priority values are possible, moving a read request to a higher-priority queue includes moving the read request to the highest-priority queue, in some embodiments. In other embodiments, where more than two priority vales are possible, moving a read request to a higher-priority queue includes moving the request to the next-highest-priority queue, or to another higher-priority queue.

In the embodiment of FIG. 5, in which multiple queues are maintained, each associated with a respective priority, requests are serviced by sequentially servicing the top request in the highest-priority queue that includes at least one buffered request, in embodiments; and servicing the lower priority queue when the higher priority queue is empty. Accordingly, in the third state 370 of FIG. 5, read request 5, which was the top request in the higher-priority queue, has been serviced.

In the third state 370 of FIG. 5, a sixth read request, read request 6, has been received and scheduled for servicing. Read request 6 has higher priority. However, because read request 6 is received after read request 1 has been moved to the higher-priority queue, read request 6 is placed in the higher-priority queue behind read request 1. Thus, in the fourth state 380 of FIG. 5, read request 1 has been serviced from the higher-priority buffer queue. Thus, as illustrated in FIG. 5, a read request (e.g., read request 6) that is received after an earlier read request (e.g., read request 1) and that is associated with a priority that is higher than the priority of the earlier read request, can be serviced after the earlier read request by virtue of the earlier read request having been rescheduled, such as by being placed in a higher-priority queue.

Figure 6:
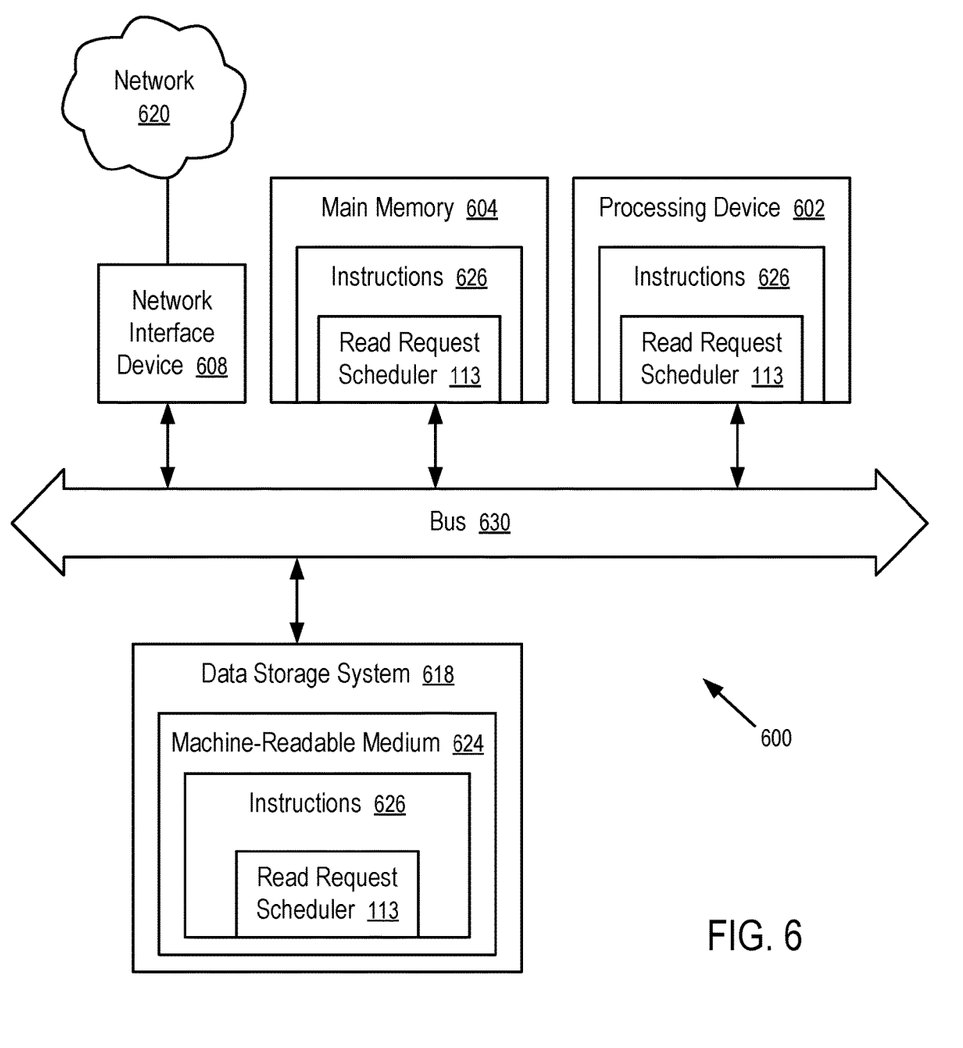
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a read request scheduler 113 (e.g., to execute instructions to perform operations corresponding to the read request scheduler 113 described with reference to FIGS. 1, 2, and 3). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 618, which communicate with each other via a bus 630 (which can include multiple buses).

Processing device 602 represents one or more general-purpose processing devices such as a microprocessor, a central processing unit (CPU), or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), a graphics processing unit (GPU), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a read request scheduler 113 (e.g., the read request scheduler 113 described with reference to FIGS. 1, 2, and 3). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory system, comprising:
a plurality of memory components; and
a processing device, operatively coupled with the plurality of memory components, to:
  receive read requests from a host system to retrieve data from the memory components;
  store the read requests in a buffer;
  track ages and priorities of the read requests, wherein the priorities are specified by the host system for the read requests;
  schedule execution of a first read request from the buffer based on an age of the first read request and a threshold time period; and
  in response to a determination that the age of the first read request has reached the threshold time period, cause the first read request to be executed prior to a second read request in the buffer by moving the first read request from a lower priority queue to a queue of read commands, wherein commands in the queue of read commands are executed in an order of commands in the queue of read commands.

2. The memory system of claim 1,
wherein the second read request is in the buffer at a time when the age of the first read request has reached the threshold time period, and wherein the host system specifies a priority for the second read request that is higher than a priority of the first read request.

3. The memory system of claim 2, wherein the processing device is further to:
  determine an execution priority of the first read request based on the priority of the first read request specified by the host system and the age of the first read request relative to the threshold time period.

4. The memory system of claim 3, wherein the processing device is further to:
  determine the threshold time period for the first read request based on the priority of the first read request specified by the host system.

5. The memory system of claim 1, wherein the processing device is further to:
  move the first read request to a top of the queue of read commands.

6. The memory system of claim 1, wherein the processing device is further to:
  transmit a response signal to the host system; and
  in response to a send command from the host system, transmit data retrieved for the first read request to the host system.

7. The memory system of claim 6, wherein the read requests, the response signal, and the send command are in accordance with a communication protocol for non-volatile dual in-line memory modules.

8. The memory system of claim 7, wherein the memory components include non-volatile memory; a communication channel between the host system and the memory system includes:
  a command bus to transmit the read commands;
  a data bus to transmit the data retrieved for the first read request; and
  a transaction bus to transmit, from the memory system to the host system, the response signal.

9. The memory system of claim 6, wherein the execution of the first read request is scheduled to limit, according to the threshold time period, elapsed time between receiving the first read request in the memory system and transmitting the response signal for the first read request.

10. A method, comprising:
  receiving, in a memory system, read requests from a host system to retrieve data from memory components of the memory system;
  storing the read requests in a buffer;
  tracking ages and priorities of the read requests, wherein the priorities are specified by the host system for the read requests;
  scheduling execution of the read requests based on the priorities and ages of the read requests in relation with a threshold time period; and
  causing a first read request to be executed before a second read request that is in the buffer in response to a determination that an age of the first read request has reached the threshold time period, and wherein the host system specifies a higher priority for the second read request than the first read request.

11. The method of claim 10, wherein the scheduling includes:
  moving the first read request to a queue of read commands in response to the determination that the age of the first read request has reached the threshold time period.

12. The method of claim 11, wherein the first read request is moved to a top of the queue of read commands.

13. The method of claim 11, wherein the queue of read commands is a first queue; and the first read request is moved from the first queue to a second queue; wherein commands in the second queue are scheduled to execution after the first queue is emptied.

14. A non-transitory computer-readable storage medium storing instructions that, when executed by a processing device, cause the processing device to:
- receive, in a memory system, read requests from a host system to retrieve data from memory components of the memory system;
- store the read requests in a buffer;
- track ages and priorities of the read requests, wherein the priorities are specified by the host system for the read requests;
- schedule execution of the read requests based on the priorities and based at least in part on whether pendency periods of the read requests in the memory system have exceeded a threshold time period; and
- cause a first read request to be executed before a second read request in response to a determination that an age of the first read request has reached the threshold time period, and wherein the host system specifies a higher priority for the second read request than the first read request.

* * * * *